US010885250B1

(12) United States Patent
White et al.

(10) Patent No.: US 10,885,250 B1
(45) Date of Patent: Jan. 5, 2021

(54) CLOCK GATE PLACEMENT WITH DATA PATH AWARENESS

(71) Applicant: Cadence Design Systems, Inc., San Jose, CA (US)

(72) Inventors: David White, San Jose, CA (US); Andrew Mark Chapman, Milton (GB); Thomas Andrew Newton, Great Cambourne (GB); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/735,666

(22) Filed: Jan. 6, 2020

(51) Int. Cl.
*G06F 30/3312* (2020.01)
*G06F 30/392* (2020.01)
*G06F 30/396* (2020.01)
*G06F 119/04* (2020.01)
*G06F 117/04* (2020.01)

(52) U.S. Cl.
CPC ........ *G06F 30/3312* (2020.01); *G06F 30/392* (2020.01); *G06F 30/396* (2020.01); *G06F 2117/04* (2020.01); *G06F 2119/04* (2020.01)

(58) Field of Classification Search
CPC .. G06F 30/3312; G06F 30/392; G06F 30/396; G06F 2119/04; G06F 2117/04
See application file for complete search history.

(56) References Cited

U.S. PATENT DOCUMENTS

| 9,135,375 | B1 * | 9/2015 | Sood | G06F 30/00 |
| 10,740,530 | B1 * | 8/2020 | Chapman | G06F 30/396 |
| 2008/0276208 | A1 * | 11/2008 | Albrecht | G06F 30/30 716/113 |
| 2008/0301593 | A1 * | 12/2008 | Jiang | G06F 30/3312 716/132 |
| 2008/0301594 | A1 * | 12/2008 | Jiang | G06F 30/3312 716/134 |
| 2010/0031214 | A1 * | 2/2010 | Hou | G06F 30/392 716/119 |
| 2012/0266124 | A1 * | 10/2012 | Alpert | G06F 30/392 716/122 |

* cited by examiner

*Primary Examiner* — Stacy Whitmore
(74) *Attorney, Agent, or Firm* — Schwegman Lundberg & Woessner, P.A.

(57) ABSTRACT

Electronic design automation systems, methods, and media are presented for clock gate placement with data path awareness. One embodiment involves accessing a circuit design with a clock tree, clock gates, and an initial movement area. A set of positions for a set of data path connection points associated with the data routing lines are identified, along with an expansion direction from the initial placement position toward the set of positions for the set of data path connection points, and the initial movement is expanded to consider additional placement options for the clock gate based on the data path connection points.

20 Claims, 8 Drawing Sheets

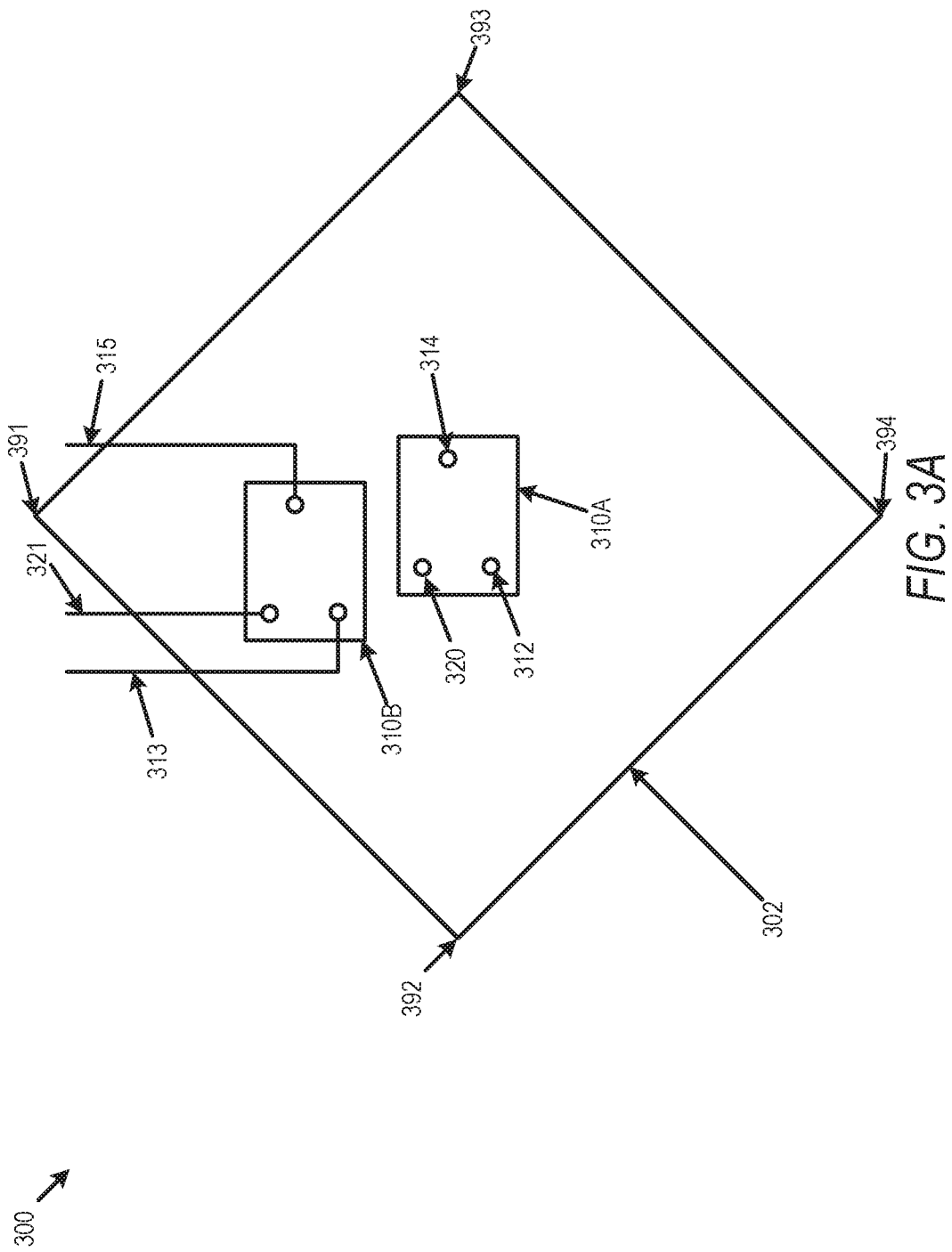

ated circuit. Cells are blocks within a design that
CLOCK GATE PLACEMENT WITH DATA PATH AWARENESS

TECHNICAL FIELD

Embodiments described herein relate to electronic design automation (EDA), and to systems, methods, devices, and instructions to perform clock gating with design selection of delay and power dimensions as part of design, verification, and generation of circuit designs.

BACKGROUND

Electronic design automation (EDA) is a category of systems for assisting with the design of electronic systems and devices. Large, integrated circuit designs are often assembled from previously designed blocks or generic designs which may include various combinations of elements. This enables reduced turnaround times for generation of an integrated circuit. Cells are blocks within a design that can be replicated. Clock tree synthesis (CTS) is a process of designing routing structures to deliver a clock signal to elements of a synchronous circuit. Schematic and layout information for such block portions of a design may be exchanged or licensed as intellectual property. During design of a specific circuit, large numbers of combinations of different variables that go into a design may require significant resources to verify that all acceptable combinations will function properly.

BRIEF DESCRIPTION OF THE DRAWINGS

Various ones of the appended drawings merely illustrate example embodiments of the present disclosure and should not be considered as limiting its scope.

FIG. 3A illustrates aspects of clock gate placement in a circuit design in accordance with some embodiments.

DETAILED DESCRIPTION

Embodiments described herein relate to EDA and to methods, computer media, and devices used for analyzing, optimizing, and creating electronic circuits. One of the many complex elements of circuit design is the generation of routing trees that convey a signal from a signal origin, or source, to a signal destination, or sink. A clock tree, for example, has a clock source and can be attached to any number of destination sinks (e.g. from a few sinks to tens of thousands of sinks or more). Clock gating is a technique used in many synchronous circuits for reducing dynamic power dissipation by adding logic to a circuit to prune the clock tree. This disables portions of the clock circuitry so that the flip-flop elements in them do not have to switch states, thus reducing power usage. Clock gates (e.g. integrated clock gate circuits or cells) that perform this gating include connections to the data path being distributed by the clock tree, as well as being part of the clock tree (e.g. part of the clock path for the clock distributed by the clock tree).

During CTS, the placement of clock gates in a physical layout includes operations to improve clock timing and reduce both clock and data path wirelengths. Embodiments described herein include operations for efficient selection of clock gate placement to balance EDA resource usage in reducing wirelength against improved performance of the resulting circuit design. Embodiments improve the operation of EDA computing device by reducing the processing resources to achieve a solution to clock gate placement while maintaining or improving the performance of the resulting circuit design. These improvements are achieved by expanding an area that is considered for clock gate placement around an initial placement location in the direction of a data path enable pin connection of the clock gate circuit, and using a limited number of test or sample points along the data and clock routes to check for improvements in circuit design delay performance (e.g. a reduction in total wirelength).

Figure 1:
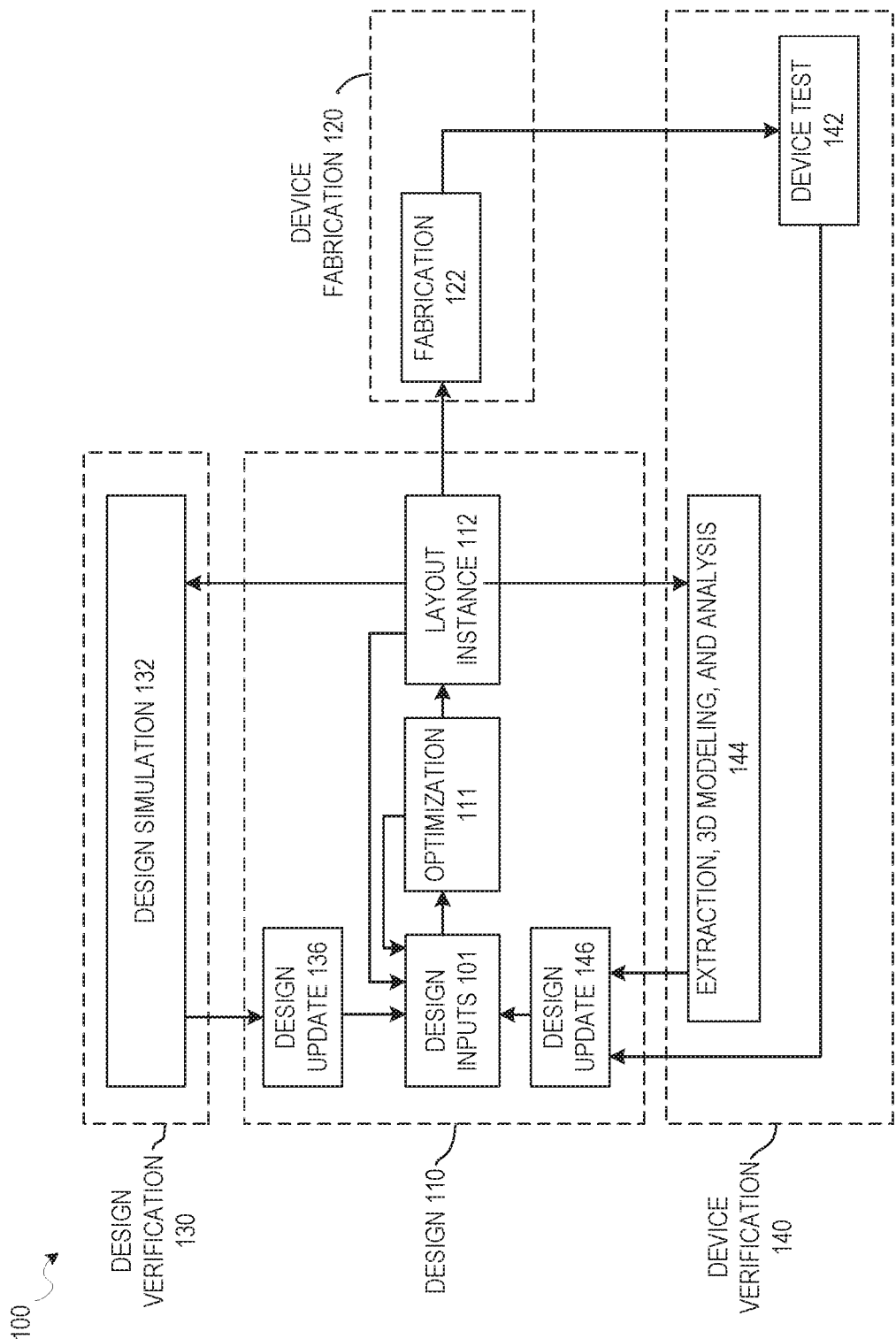
FIG. 1 is a diagram illustrating one possible design process flow for generating a circuit including embodiments to meet timing constraints according to some embodiments.

FIG. 1 is a diagram illustrating one possible design process flow which includes elements for clock gate placement with data path awareness as part of a circuit design process flow. It will be apparent that other design flow operations can function using such multi-dimension clock gate design as described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts for a clock tree structure and associated sinks and clock gates are generated, before adjustments are made to ensure that timing requirements are met as well as additional revisions to improve device performance. The initial strategy, tactics, and context for the device to be created are also generated in the design input operation 101, depending on the particular design algorithm to be used.

In some embodiments, following an initial selection of design values in design input operation 101, a routing tree may be generated, in accordance with various embodiments described herein, during optimization operation 111 or layout instance 112, along with any other automated design processes. As described below, design constraints for a routing tree structure, sinks which receive a signal from the routing tree structure, and initial clock gate placement, may be initiated with design inputs in design input operation 101, and then may be analyzed and optimized using operations described herein according to various embodiments. While design flow 100 shows such optimization occurring prior to layout instance 112, updates to a routing tree may be performed at any time to improve expected operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating or updating a routing tree structure, including updating clock gate placement to reduce wirelength, can therefore involve iterations of design input operation 101, optimization operation 111, and layout instance 112 generation. In other systems, other design processes may be used.

After design inputs are used in design input operation 101 to generate a circuit layout, and any optimization operations 111 are performed, a layout is generated in layout instance 112. The layout describes the physical layout dimensions of the device that match the design inputs. This layout may then be used in a device fabrication operation 122 to generate a device, or additional testing and design updates may be performed using designer inputs or automated updates based on the design simulation 132 operations or extraction, 3D (three-dimensional) modeling, and analysis 144 operations. Once the device is generated, the device can be tested as part of device test 142 operations, and layout modifications generated based on actual device performance.

Design updates 136 from design simulation 132, design updates 146 from device test 142 or extraction, 3D modeling, and analysis 144 operations, or direct design input operation 101 may occur after an initial layout instance 112 is generated. In various embodiments, whenever design inputs are used to update or change an aspect of a circuit design, a timing analysis and optimization operation 111 may be performed.

Figure 2:
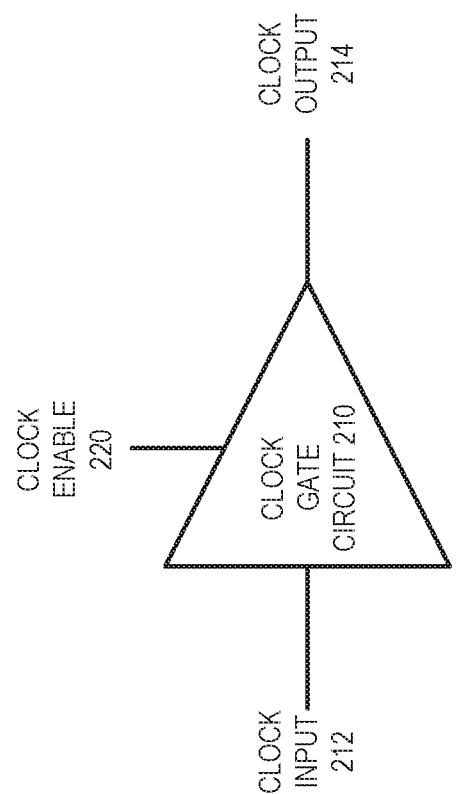
FIG. 2 illustrates an example clock gate circuit for use in accordance with some embodiments.

FIG. 2 illustrates an example clock gate circuit 210 for use in accordance with some embodiments. Illustrated clock gate circuit 210 includes a clock input 212, a clock output 214, and a clock enable 220. Within a circuit design, clock gates are special cells due to their routing connections to both the clock net and the data path net. The clock enable 220 pin on clock gate circuit 220 controls whether the clock is output at clock output 214. When the clock enable 220 is selected (e.g. on), then the clock signal is passed through from clock input 212 to clock output 214, and when the clock enable 220 is not selected (e.g. off), then the clock signal is not output from clock output 214 (e.g. no signal is output from clock output 214). Clock gate circuit 210 thus functions as a switch to turn off parts of a circuit. This allows lower power use by conserving power when parts of a circuit in a circuit design are not in use.

During CTS, placement of the clock gate circuit 210 takes up physical space and includes routing traces as part of a clock tree and as part of a data path (e.g. a data path connection to clock enable 210 pin to identify when data is passing to relevant parts of the circuit design and when data is not passing to the relevant parts of the design so that those parts can be turned off to conserve power).

FIG. 3A illustrates aspects of clock gate 310 placement in a circuit design 300 in accordance with some embodiments. As described above, clock gate circuits such as clock gate 310 include connections to both clock and data paths. Because other parts of the clock tree do not have this data path connection (e.g. buffers and inverters), the process for reducing routing length in the other parts of the clock tree only consider clock routing lines. Because of this, clock gates are often optimized in a similar fashion during CTS, with the clock path routing lines considered, and the data path routing lines ignored. Additionally, an initial placement can be set for clock gates before CTS optimization operations as described herein are implemented. Circuit design 300 of FIG. 3A shows clock gate 310 in an initial placement positions as clock gate 310A. Subsequent optimizations during CTS as described herein assume that the initial placement position (e.g. as illustrated by the placement of clock gate 310A) are in a position where large movements are not preferred. This is both because of the procedures in the initial placement and to prevent cascading complexity as large movements of a clock gate can have impacts up and down the clock tree and the data path. Because of this, a movement area 302 is defined as a small region for adjustments of a clock gate position. The movement area 302 is sufficiently small that it is unlikely to have large impacts through the clock tree and circuit design, but large enough to allow shortening of routes to clock gate 310 which can improve timing performance. Particularly in high performance designs, small improvements such as shortened route lines can result in valuable incremental improvements. In some embodiments, movement area 302 is a Manhattan ball (e.g. a boundary defined by equal rectilinear distances from a center or a boundary defined by equal steps in a Manhattan geometry space from the center position where clock gate 310A is located).

As shown in FIG. 3A, clock gate 310 includes a clock input 312, a clock output 314, and an enable pin 320, similar to the elements of clock gate circuit 210 of FIG. 2. As clock gate 310 is moved to different positions, such as the position of clock gate 310B (after removing the version 310A from the circuit design) the routes 313, 315, and 321 connected to the respective pins of clock gate 310 (e.g. clock input 312, clock output 314, and clock enable 320) the lengths of the wires for routes 313, 315, and 321 change. If routes 313, 315, and 321 all run in the same direction as shown in FIG. 3A, then moving the clock gate 310 from the position show for clock gate 310A to the position for clock gate 320B, then the total wirelength for routes 313, 321, and 315 will be reduced, providing an improvement to the circuit design.

The initial movement area 302 defines the limits of positions that are considered for placement of clock gate 310 to assess wire length reduction or other benefits. In initial movement area can be defined based on a rule, or selected as a defined shape by an input from a circuit designer. In one embodiment, the initial movement area is defined as a Manhattan ball that is a fixed number of steps in the routing grid away from an initial placement position for the clock gate. For example, if an initial placement position has coordinates of (0,0), and the initial movement area is defined by a border ten row heights from the initial placement position, then the points (10,0), (0,10), (−10, 0), and (0, −10) would define corner points of the initial movement area, with other points such as (9,1), (−5,5), and (3, −7) on the boundary lines between the corner points). In FIG. 3A, corner points 391-394 are example points of such an initial movement area. In other embodiments, other shapes can be arbitrarily defined, or other rules can be used, including rules based on other elements or existing routes within a nearby area close to the initial placement position in the circuit design. In such embodiments, the initial movement area can shrink if other elements are close and blocking placement of the clock gate, or grow if few elements are blocking placement of the clock gate. In further embodiment, any such rules or designer inputs can be used to select an initial movement area for a clock gate, and different clock gates within a circuit design can thus either share a similar movement area around the initial placement point for a particular clock gate, or have an initial movement area that is modified or customized based on the surrounding details of the initial placement point for a particular clock gate.

During CTS, as clock cells such as clock gate 310 are moved, the CTS operations reconnect clock path wires, and retime and remeasure the transitions and delays in the clock path. The data path, however, is not subject to such measurements during CTS. As described above, this contributes to the focus on clock routes during clock gate placement, as measurement and analysis of the data path would be computationally prohibitive. In some situations, however, the movement area 302 does not include positions that could provide improvements to the circuit design associated with the data path. Embodiments described herein provide a targeted expansion to movement area 302 to accommodate possible clock gate placements with improved performance due to data path considerations.

Figure 3B:
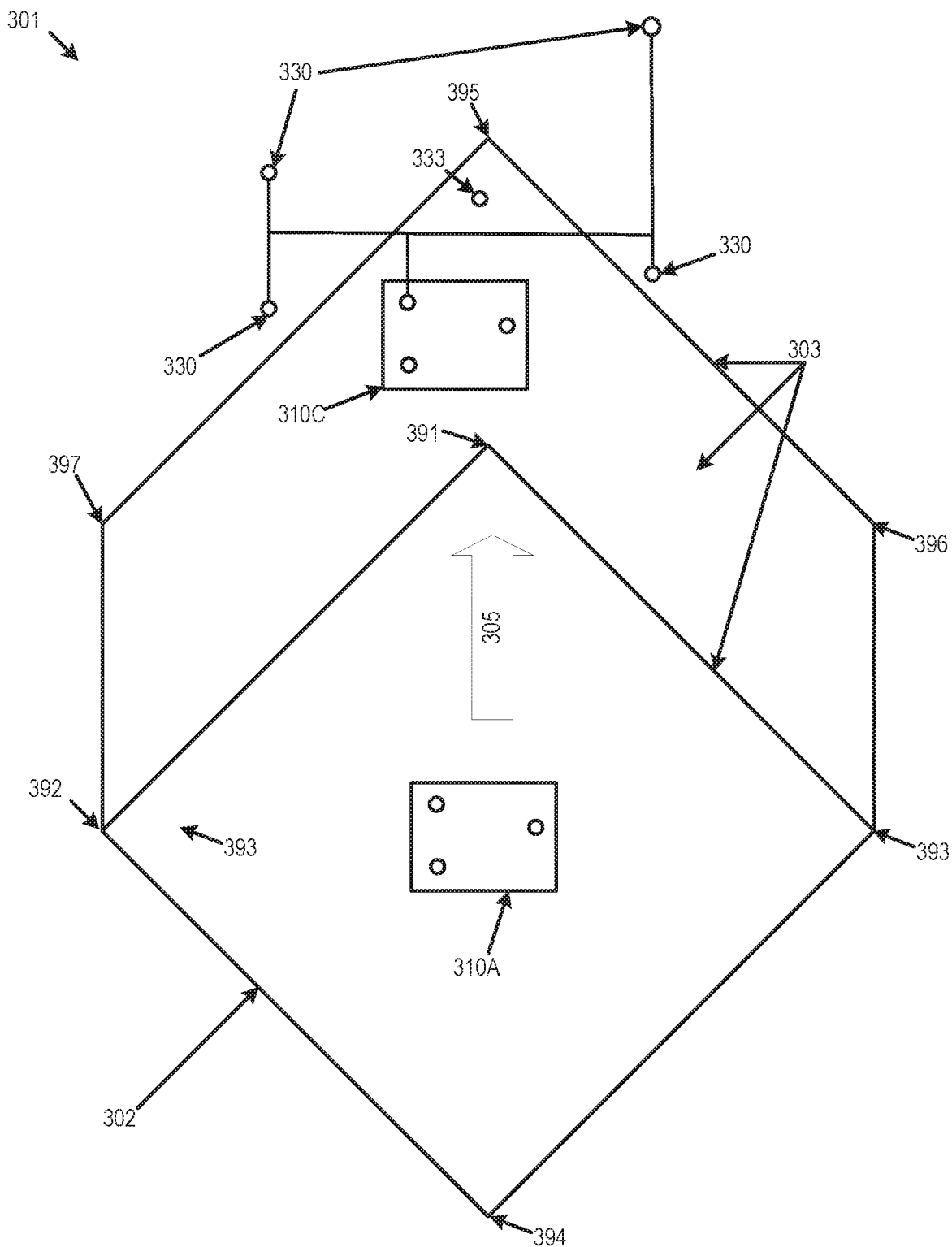
FIG. 3B illustrates aspects of clock gate placement with data path awareness in a circuit design in accordance with some embodiments.

FIG. 3B illustrates aspects of clock gate 310 placement with data path awareness in a circuit design in accordance with some embodiments. In order to take advantage of additional wire length reduction possibilities that are outside of an initial movement area 302, which is primarily based on expected improvements for clock path connections, embodiments described herein consider additional placement positions in an expanded movement area 303 which is created based on data path routes connected to clock enable 320. In addition to showing an initial placement of clock gate 310 as clock gate 310A, circuit design 301 shows clock gate 310C in a placement position outside the initial movement area 302. The extended movement area 303, which includes both the initial movement area 302 as well as an additional area, is generated based on the data path routes. In FIG. 3B, a set of positions 330 for a set of data path connection points are shown, and the expansion of the initial movement area to generate the extended movement area is generated based on an expansion direction 305 from the initial placement point of clock gate 310A toward the set of points associated with the data path connection points. By expanding the area considered for placement of the clock gate toward the data path connection points, CTS analysis is able to consider routings that consider the length of data path connections to a clock gate without a full analysis of the data path, which would be resource intensive and computationally prohibitive. By expanding the initial movement area in the expansion direction toward the data path connection points, a limited number of placement positions can be analyzed and selected in a resource efficient manner. For example, once the extended movement area is defined, a subset of points within the extended movement area can be analyzed to determine a preferred updated placement position for the clock gate (e.g. based on a total wirelength for connections to the clock gate, delay performance, or other performance characteristics for each assessed placement position). Such an analysis can select a final placement position based on a weighted score of performance criteria, design thresholds, or other such selection criteria.

In various embodiments, the expansion of the initial movement area toward the data path connection points can be performed in different ways. In some embodiments, points on a boundary of an initial movement area (e.g. a Manhattan ball) away from the movement direction can be kept in place, with points toward the movement direction shifted, and then connected to the initial parts of the boundary that remain in place. In the example of FIG. 3*b*, the boundary lines between corners 392, 394, and 393 remain a boundary for the extended movement area 303, while the boundary lines between corners 392, 391, and 393 are shifted, with the new corner 397 connected to the initial corner 392, and the new corner 396 connected to the old corner 393 after the expansion, and corner 391 replaced by corner 395. In other embodiments, other shifts or transformations can be used to expand initial movement area 302 into an extended movement area 303.

Additionally, the size of the expansion can be determined in different ways in different embodiments. As described above, positions 330 are for data path connection points to be routed to a clock enable 320 pin of clock gate 310, regardless of a position of the clock gate 310 (e.g. placements for clock gate 310A, 310B, and 310C). In one embodiment, an average points 333 for the set of positions 330 is calculated. The expansion direction 305 can be defined as a direction or vector from an initial placement position of clock gate 310 toward the average position 333. In other embodiments, the expansion direction 305 is only along a primary direction which is defined as a direction (e.g. horizontal or vertical) in the Manhattan grid for the circuit design in which the average position is further from the initial placement point. For example, in FIG. 3B, average position 333 is on the same column as the initial placement of clock gate 310. In some embodiments, the expansion direction could be along the vertical column even if the average position was off center from the column of the initial placement position, so long as the offset is less than the distance. For example, of the average position were near corner 392, the expansion direction could be defined as a horizontal direction from the initial placement position toward corner 392. In other embodiments, the expansion direction 305 can be diagonal. Once the expansion direction 305 is identified, the amount of the expansion can be defined or determined in various ways. For example, in some embodiments, the extended movement area 303 can be set as an as expansion a fixed number of steps along the Manhattan grid in the expansion direction, to limit the additional area to be considered. In some embodiments, the extended movement area 303 is defined to touch or encompass the average position, or a closest position any of the data path connection points to the initial placement point. In other embodiments, any such rules or user defined shapes or considerations for expanding the area considered for clock gate placement can be selected, based the use of processing resources to consider the additional area, and the potential for performance improvements based on a placement of the clock gate.

Figure 4:
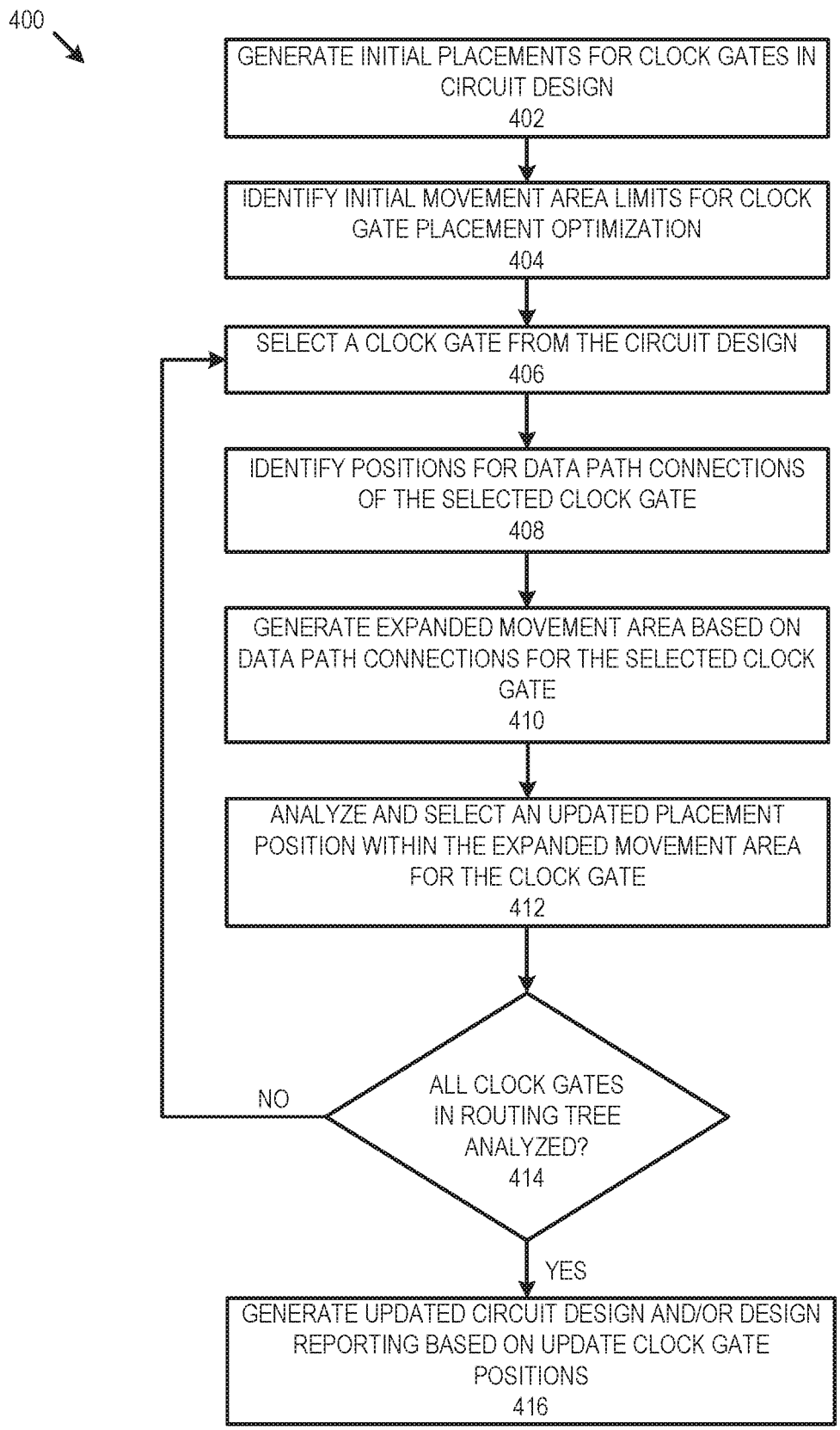
FIG. 4 is a flow diagram for clock gate placement with data path awareness in a circuit design in accordance with some embodiments.

FIG. 4 is a flow diagram of a method 400 for clock gate placement with data path awareness in a circuit design in accordance with some embodiments. As described above, during a design flow (e.g. design flow 100) for a circuit design, an initial placements for clock gates in the circuit design are selected during operation 402. Additionally, shapes, rules, or other criteria are determined during CTS for an initial movement area for each clock gate to consider adjusting the initial placement of each clock gate to improve circuit design performance in operation 404. Operations 402 and 404 can both be performed by the same device as part of CTS operations, or can be performed independently, with the relevant data provided to an EDA computing device performing CTS. Then, during CTS operations to check clock gate placements and consider new clock gate positions based on an awareness of improvements to data path connections, a set of operations to check performance and placement of some or all clock gates in the system is performed. This begins with operation 406 to select a clock gate to be analyzed with clock gate placement updated based on data path awareness. FIG. 4 describes a loop to consider clock gate placement from initial placement positions, but such operations can be repeated in various ways and for different parts of CTS in various loops throughout a design flow. Many repetitions of various portions of such operations can be repeated as part of CTS operations.

Data path connections to the selected clock gate are identified in operation 408, and in operation 410, an expanded movement area is generated based on the data path connections for the selected clock gate. In some embodiments, as described above, this operation 410 can involve identifying an expansion direction and transforming or expanding the initial movement area (e.g. the area including points in a grid to be considered for a new clock gate placement) based on the expansion direction. In other embodiments, a designer selected boundary can be used (e.g. a boundary created by the data path connection point positions or an arbitrary shape defined by a user selection to consider points closer to the data path for the clock gate).

Once the expanded movement area is defined, then in operation 412 various possible placement positions within the expanded movement area can be analyzed to determine whether a new position for the clock gate will improve performance. This can involve a sample or a directed set of placement positions in the extended movement area selected for analysis. For each selected placement position, and updated routing can be generated and analyzed for the connections to the clock gate, with a final placement position selected that meets minimum design criteria and provides a best overall performance (e.g. a lowest total wirelength without creating design rule violations). These operations can then proceed with some or all of the clock gates in the circuit design in operation 414, until all clock gates to have a placement position analyzed based on data path connections is complete. An updated circuit design or a set of EDA reporting data is then generated in operation 416 based on the updated clock gate positions for each analyzed clock gate.

Figure 5:
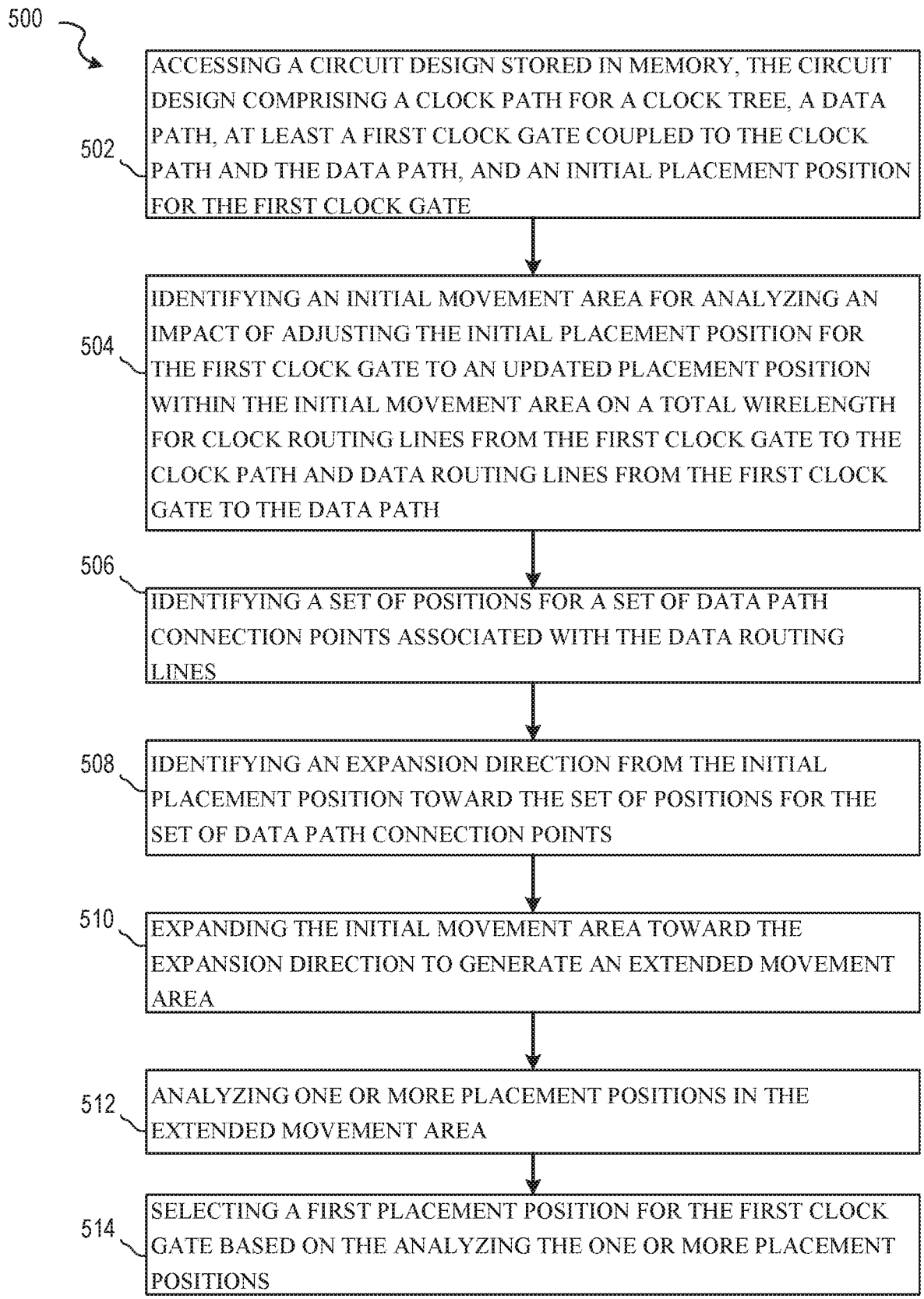
FIG. 5 describes a method of clock gate placement with data path awareness in a circuit design in accordance with some embodiments.

FIG. 5 describes a method 500 of clock gate placement with data path awareness in a circuit design in accordance with some embodiments. In some embodiments, method 500 is a method performed by an EDA computing device to generate design files for a circuit design. In some embodiments, method 500 is represented by instructions stored in a memory of an EDA computing device or in a non-transitory computer-readable medium, where the instructions cause the EDA computing device to perform method 500 when executed by one or more processors.

Method 500 begins with operation 502 accessing, by one or more hardware processors (e.g. processors 710), a circuit design stored in memory. A circuit design according to such an operation can include various different elements, but includes data for a clock path for a clock tree, a data path, at least a first clock gate coupled to the clock path and the data path, and an initial placement position for the first clock gate. In various embodiments, a circuit design can include any number of clock gates, along with information about the connections and routing paths for each clock gate.

An initial movement area is then identified in operation 504. As described above, the initial movement area can be a fixed area around the initial placement position for a particular clock gate (e.g. a Manhattan ball with a boundary a fixed number of steps from the initial placement point) The initial movement area defines the limits of potential new positions to be analyzed for an impact on design performance and adjusting the initial placement position for the first clock gate to an updated placement position within the initial movement area. The performance impact includes performance associated with a total wirelength for clock routing lines from the first clock gate to the clock path and data routing lines from the first clock gate to the data path. As described above, by selecting the area of possible new placement positions based both on the initial movement area as well as the data path connections, embodiments described herein improve the EDA design process and the resulting circuit design.

The method 500 then includes operation 506 identifying a set of positions for a set of data path connection points associated with the data routing lines, and operation 508 identifying an expansion direction from the initial placement position toward the set of positions for the set of data path connection points. While method 500 identifies an expansion direction, in other embodiments, the extended movement area can be generated based on the expansion direction without an explicit calculation of the expansion direction by an EDA computing device. Operation 510 then involves expanding the initial movement area toward the expansion direction, using the one or more hardware processors, to generate an extended movement area, and in operation 512, the extended movement area is used to analyze one or more placement positions in the extended movement area for performance improvements (e.g. clock gate placement based on the data path awareness to improve performance). This analysis can include both total wirelength for each position, as well as any other design rule violations for a circuit design. In operation 512, after analysis of the placement positions in the extended movement area, a final placement position is selected for the clock gate.

In various embodiments, as described above, the initial movement area is a Manhattan ball around the initial placement position for a routing grid of the circuit design. In some such embodiments, the Manhattan ball is an area defined by a border with each point of the border located a fixed number of lengths (e.g. 10 row heights, 15 lengths, 16 lengths, etc.) from a central placement point of the initial placement position for the clock gate. In some additional embodiments, identifying the expansion direction from the initial placement position toward the set of positions for the set of data path connection points comprising calculating an average position of the set of positions, and can also involve expanding the initial movement area toward the expansion direction by expanding the initial movement area to include points in a placement grid of the circuit design closer to the average position than points of the initial movement area. Similarly, some embodiments can operate where the Manhattan ball comprises four corners, each corner associated with a horizontal position and a vertical position in the placement grid of the circuit design.

In some embodiments, a transform can be used to translate some corner positions of an initial movement area to generate an extended movement area. For example, in one embodiment, expanding the initial movement area toward the expansion direction, using the one or more hardware processors, to generate the extended movement area includes operations using the boundary points of the initial movement area to determine boundary points of the extended movement area by the following operations. Identifying a first corner of the Manhattan ball closest to the average position, a second corner and a third corner of the Manhattan ball equidistant from the first corner on either side of the Manhattan ball, and a fourth corner opposite the first corner. Identifying a first coordinate of the average position that is further away from the first corner in a first dimension of the placement grid than a second coordinate of the average position in a second dimension. Generating the extended movement area using the second corner, the third corner, the fourth corner, a fifth point with a first coordinate equal to a first coordinate of the average point and the second coordinate equal to a second coordinate of the first corner, a sixth point with a second coordinate equal to a second coordinate of the second corner and a first coordinate determined by shifting a first coordinate of a second corner by an amount equal to a difference between the first coordinate of the first corner and the first coordinate of the fifth corner, and a sixth corner with a second coordinate equal to a second coordinate of the third corner and a first coordinate determined by shifting a first coordinate of a third corner by an amount equal to a difference between the first coordinate of the first corner and the first coordinate of the fifth corner. Such operations can be used, for example, to use corners 391-394 of initial placement area 394 to determine the corners 392-397 of extended placement area 303.

Other embodiments can operate where expanding the initial movement area toward the expansion direction generate the extended movement area, comprises shifting a first corner of the Manhattan ball in a horizontal direction and a second corner of the Manhattan ball in a vertical direction to create the extended movement area as an updated area that encompasses the average point.

In some embodiments, rather than a rule defined area as described above (e.g. a Manhattan ball with a set distance from an initial placement point), the initial movement area is an area defined by a designer input. This designer defined area can be any area defining points in the placement and routing grid for a circuit design (e.g. the area defined by the designer input comprises an irregular shape that is not a Manhattan ball.)

In some embodiment, regardless of the definition of the initial placement area, the extended movement area is generated by splitting the area defined by the designer input into a first part in an original position and a second part and a second part in an original position, shifting a first part to a new position in the expansion direction, and connecting the first part of the area in the new position with the second part in the original position. In some such embodiments, the new position of the first part is extended to encompass a closest point of the set of positions for a set of data path connection points associated with the data routing lines. In some embodiments, the new position of the first part is extended to encompass an average point of the set of positions for a set of data path connection points associated with the data routing lines.

In some embodiments, analyzing the one or more placement positions comprises calculating a total wirelength for the clock routing lines and the data routing lines for each position of the one or more placement positions and then selecting the first placement position based on a shortest wirelength for said each of the one or more placement positions. In any embodiment, after clock placement is selected for any number of clock gates in a circuit design, the operations can include generating an updated circuit design using the first placement position for the first clock gate and storing the updated circuit design in the memory (e.g. memory 730).

In some embodiments, the operations proceed after operation 514 or any such operations above with generating or initiating generation of a set of masks from the updated circuit design for use in generating an integrated circuit comprising the updated circuit design. The component arrangement defined and generated in the above operations may then be used to fabricate (e.g., generate) or initiate generation of an integrated circuit using the component arrangement. In various embodiments, various devices, systems, and methods are used to fabricate devices based on the updated circuit design. In some embodiments, this includes generation of masks and the use of machinery for circuit fabrication. In various implementations, files generated by embodiments described herein are used to create photolithographic masks for lithography operations used to generate circuits according to a circuit design, where a pattern defined by the masks is used in applying a thin uniform layer of viscous liquid (photo-resist) on the wafer surface. The photo-resist is hardened by baking and then selectively removed by projection of light through a reticle containing mask information. In some implementations, the files are further used for etching patterning, where unwanted material from the surface of the wafer is removed according to details described in the design files, where a pattern of the photo-resist is transferred to the wafer by means of etching agents. In some embodiments, aspects of design files generated according to the operations described herein are used for deposition operations, where films of the various materials are applied on the wafer. This may involve physical vapor deposition (PVD), chemical vapor deposition (CVD) or any such similar processes. Some embodiments may use files generated according to operations described herein for chemical mechanical polishing, where a chemical slurry with etchant agents is used to planarize to the wafer surface, for oxidation where dry oxidation or wet oxidation molecules convert silicon layers on top of the wafer to silicon dioxide, for ion implantation where dopant impurities are introduced into a semiconductor using a patterned electrical field, or for diffusion where bombardment-induced lattice defects are annealed. Thus, in various embodiments, systems and operations include not only computing devices for generating updated circuit design files, but also hardware systems for fabricating masks, controlling IC fabrication hardware, and the hardware and operations for fabricating a circuit from a circuit design (e.g., component arrangement) generated in accordance with various embodiments described herein.

In addition to the operations of method 500 above, it will be apparent that other embodiments are possible within the scope of the described innovations. For example, one embodiment includes a memory configured to store a circuit design, the circuit design comprising a clock path for a clock tree, a data path, at least a first clock gate coupled to the clock path and the data path, and an initial placement position for the first clock gate, along with one or more processors coupled to the memory and configured to perform operations for clock gate placement with data path awareness. Such operations can include identifying an initial movement area for analyzing an impact of adjusting the initial placement position for the first clock gate to an updated placement position within the initial movement area on a total wirelength for clock routing lines from the first clock gate to the clock path and data routing lines from the first clock gate to the data path, identifying a set of positions for a set of data path connection points associated with the data routing lines, identifying an expansion direction from the initial placement position toward the set of positions for the set of data path connection points, analyzing a set of placement positions comprising at least a first placement position outside the initial movement area, wherein a location of the first placement position is based on the expansion direction, and selecting the first placement position for the first clock gate based on the analyzing the set of placement positions.

Another embodiment can include operations for identifying an initial movement area for analyzing an impact of adjusting the initial placement position for the first clock gate to an updated placement position within the initial movement area on a total wirelength for clock routing lines from the first clock gate to the clock path and data routing lines from the first clock gate to the data path, identifying a set of positions for a set of data path connection points associated with the data routing lines, and using these positions in considering clock gate placement. This consideration can include identifying an expansion direction from the initial placement position toward the set of positions for the set of data path connection points, expanding the initial movement area toward the expansion direction, using the one or more hardware processors, to generate an extended movement area, and analyzing one or more placement positions in the extended movement area. Selection of a first placement position for the first clock gate is then based on the analyzing the one or more placement positions.

Additionally, it will be apparent that any apparatus or operations described herein in accordance with various embodiments may be structured with intervening, repeated, or other elements while still remaining within the scope of the contemplated embodiments. Some embodiments may include multiple receivers, along with any other circuit elements. Some embodiments may function with described operating modes as well as other operating modes. The various embodiments described herein are thus presented as examples, and do not exhaustively describe every possible implementation in accordance with the possible embodiments.

Figure 6:
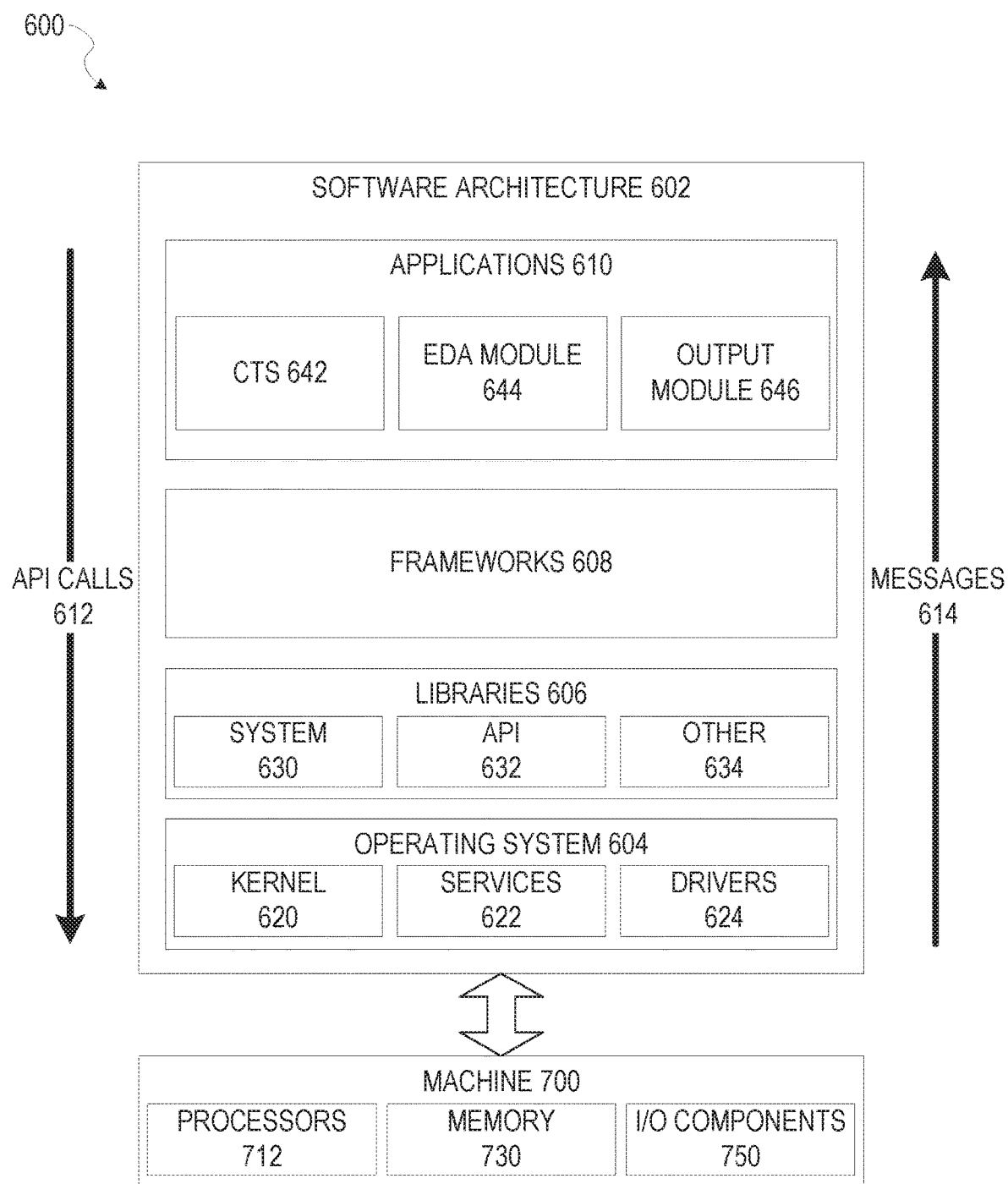
FIG. 6 is a block diagram illustrating an example of a software architecture that may be operating on an EDA computer and used with methods for routing tree generation to update a circuit design, according to some example embodiments.

FIG. 6 is a block diagram 600 illustrating an example of a software architecture 602 that may be operating on an EDA computer and used with methods for clock gate placement with data path awareness, according to some example embodiments. Software architecture 602 can be used as an electronic design automation computing device to implement any of the methods described above. Aspects of software architecture 602 may, in various embodiments, be used to store circuit designs and execute timing analysis or optimization in an EDA environment to generate circuit designs, with physical devices generated using these circuit designs.

FIG. 6 non-limiting example of a software architecture 602, and it will be appreciated that many other architectures can be implemented to facilitate the functionality described herein. In various embodiments, the software architecture 602 is implemented by hardware such as machine 700 that includes processors 710, memory 730, and input/output (I/O) components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments. In various embodiments, any client device, server computer of a server system, or any other device described herein may operate using elements of software architecture 602. An EDA computing device described herein may additionally be implemented using aspects of the software architecture 602, with the architecture 602 adapted for operating to perform clock synthesis and modification of clock gate placement using data path awareness in accordance with embodiments herein.

In one embodiment, an EDA application of applications 610 performs routing tree generation and/or adjustments, according to embodiments described herein, using various modules within software architecture 602. For example, in one embodiment, an EDA computing device similar to machine 700 includes memory 730 and one or more processors 710. The processors 710 implement a clock tree synthesis module 642 to improve routing tree synthesis in some embodiments. The processors 710 also implement additional EDA module(s) 644 to implement various circuit design operations. The design is finalized by an output module 646 if the criteria/design thresholds are met.

In some embodiments, processor-implemented output module 646 may then be used to update a display of I/O components 750 of the EDA computing device with data associated with the updated routing tree generated by the process.

In various other embodiments, rather than being implemented as modules of one or more applications 610, some or all of modules 642, 644, and 646 may be implemented using elements of libraries 606 or operating system 604.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 such as libraries of multi-instance blocks for use in an EDA environment or other libraries that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 606 may also include other libraries 634.

The software frameworks 608 provide a high-level common infrastructure that can be utilized by the applications 610, according to some embodiments. For example, the software frameworks 608 provide various graphic user interface (GUI) functions, high-level resource management, high-level location services, and so forth. The software frameworks 608 can provide a broad spectrum of other APIs that can be utilized by the applications 610, some of which may be specific to a particular operating system 604 or platform. In various embodiments, the systems, methods, devices, and instructions described herein may use various files, macros, libraries, and other elements of an EDA design environment to implement analysis described herein. This includes analysis of input design files for an integrated circuit design, along with any element for routing tree synthesis, testing, and design updating that may be used as part of or along with the embodiments described herein. While netlist files, library files, SDC files and viewdefinition files are examples that may operate within a software architecture 602, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 700 including processors 710), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 700, but deployed across a number of machines 700. In some example embodiments, the processors 710 or processor-implemented modules are located in a single geographic location (e.g., within a home environment, an office environment, or a server farm). In other example embodiments, the processors 710 or processor-implemented modules are distributed across a number of geographic locations.

Figure 7:
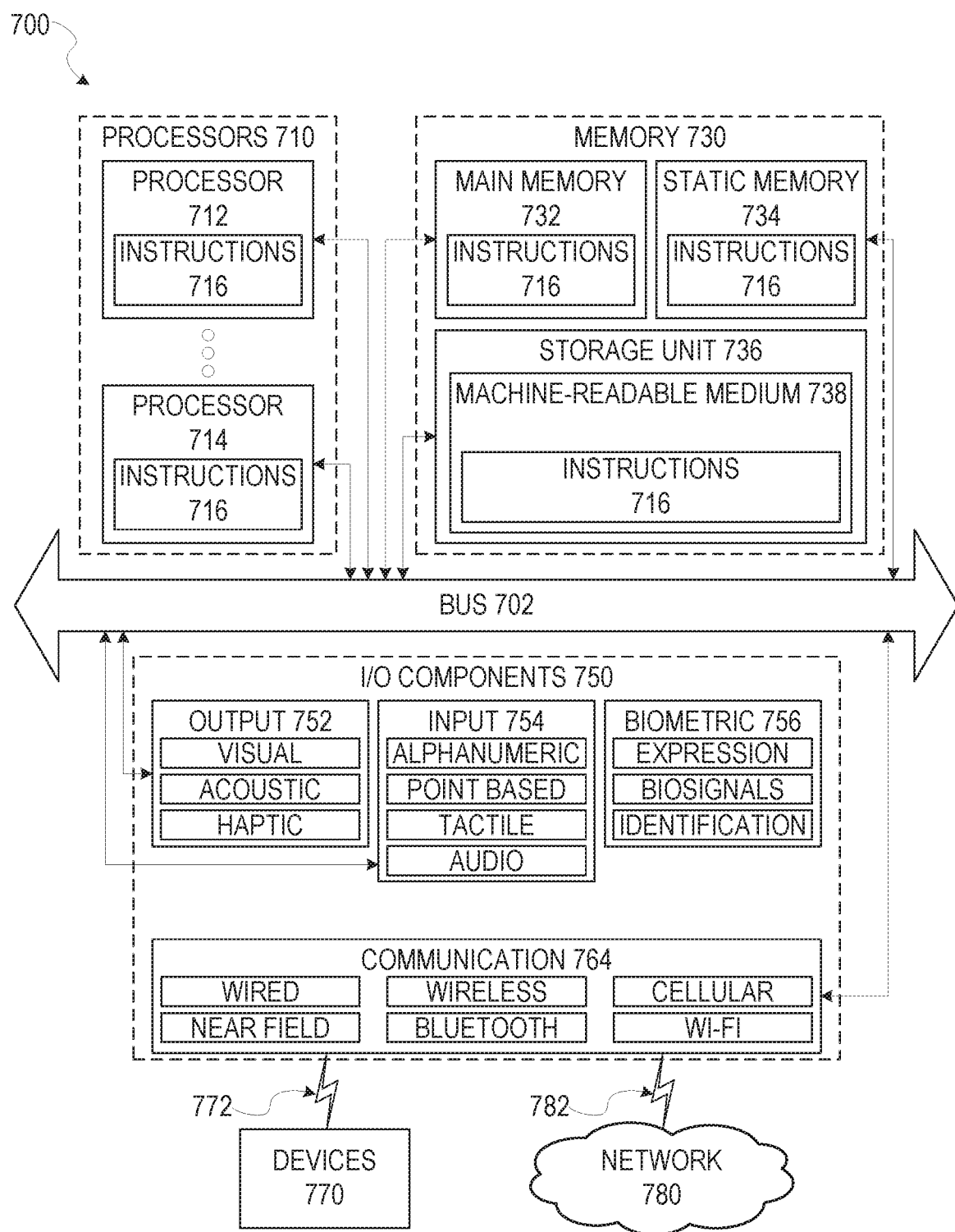
FIG. 7 is a diagrammatic representation of a machine in the form of a computer system within which a set of instructions are executed, causing the machine to perform any one or more of the methodologies discussed herein, according to some example embodiments.

FIG. 7 is a diagrammatic representation of the machine 700 in the form of a computer system within which a set of instructions may be executed for causing the machine 700 to perform any one or more of the methodologies discussed herein, according to an example embodiment. FIG. 7 shows components of the machine 700, which is, according to some embodiments, able to read instructions from a machine-readable medium (e.g., a machine-readable storage medium) and perform any one or more of the methodologies discussed herein. In some embodiments, the machine 700 may operate with instructions 716 (e.g., software, a program, an application, an applet, an app, or other executable code) for causing the machine 700 to perform any one or more of the methodologies discussed. In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 712 with a single core, a single processor 712 with multiple cores (e.g., a multi-core processor 712), multiple processors 710 with a single core, multiple processors 710 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine or any of a wide variety of peripheral devices (e.g., a peripheral device coupled via a USB).

Transmission Medium

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 738 is non-transitory (in other words, not having any transitory signals) in that it does not embody a propagating signal. However, labeling the machine-readable medium 738 "non-transitory" should not be construed to mean that the medium 738 is incapable of movement, the medium 738 should be considered as being transportable from one physical location to another. Additionally, since the machine-readable medium 738 is tangible, the medium 738 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computer-implemented method comprising:
  accessing, by one or more hardware processors, a circuit design stored in memory, the circuit design comprising a clock path for a clock tree, a data path, at least a first clock gate coupled to the clock path and the data path, and an initial placement position for the first clock gate;
  identifying, using the one or more hardware processors, an initial movement area for analyzing an impact of adjusting the initial placement position for the first clock gate to an updated placement position within the initial movement area on a total wirelength for clock routing lines from the first clock gate to the clock path and data routing lines from the first clock gate to the data path;

identifying, using the one or more hardware processors, a set of positions for a set of data path connection points associated with the data routing lines;

identifying, using the one or more hardware processors, an expansion direction from the initial placement position toward the set of positions for the set of data path connection points;

expanding the initial movement area toward the expansion direction, using the one or more hardware processors, to generate an extended movement area;

analyzing, using the one or more hardware processors, one or more placement positions in the extended movement area; and selecting, using the one or more hardware processors, a first placement position for the first clock gate based on the analyzing the one or more placement positions.

2. The method of claim 1, wherein the initial movement area is a Manhattan ball around the initial placement position for a routing grid of the circuit design.

3. The method of claim 2, wherein the Manhattan ball is an area defined by a border with each point of the border located ten lengths from a central placement point of the initial placement position for the clock gate.

4. The method of claim 3, wherein the identifying the expansion direction from the initial placement position toward the set of positions for the set of data path connection points comprising calculating an average position of the set of positions; and wherein the expanding the initial movement area toward the expansion direction to generate the extended movement area, comprises expanding the initial movement area to include points in a placement grid of the circuit design closer to the average position than points of the initial movement area.

5. The method of claim 4, wherein the Manhattan ball comprises four corners, each corner associated with a horizontal position and a vertical position in the placement grid of the circuit design.

6. The method of claim 5, wherein the expanding the initial movement area toward the expansion direction to generate the extended movement area, comprises:

identifying a first corner of the Manhattan ball closest to the average position, a second corner and a third corner of the Manhattan ball equidistant from the first corner on either side of the Manhattan ball, and a fourth corner opposite the first corner;

identifying a first coordinate of the average position that is further away from the first corner in a first dimension of the placement grid than a second coordinate of the average position in a second dimension; and generating the extended movement area using the second corner, the third corner, the fourth corner, a fifth point with a first coordinate equal to a first coordinate of the average point and the second coordinate equal to a second coordinate of the first corner, a sixth point with a second coordinate equal to a second coordinate of the second corner and a first coordinate determined by shifting a first coordinate of a second corner by an amount equal to a difference between the first coordinate of the first corner and the first coordinate of the fifth corner, and a sixth corner with a second coordinate equal to a second coordinate of the third corner and a first coordinate determined by shifting a first coordinate of a third corner by an amount equal to a difference between the first coordinate of the first corner and the first coordinate of the fifth corner.

7. The method of claim 5, wherein the expanding the initial movement area toward the expansion direction generate the extended movement area, comprises shifting a first corner of the Manhattan ball in a horizontal direction and a second corner of the Manhattan ball in a vertical direction to create the extended movement area as an updated area that encompasses the average point.

8. The method of claim 1, wherein the initial movement area is an area defined by a designer input.

9. The method of claim 8, where the extended movement area is generated by splitting the area defined by the designer input into a first part in an original position and a second part and a second part in an original position, shifting a first part to a new position in the expansion direction, and connecting the first part of the area in the new position with the second part in the original position.

10. The method of claim 9, wherein the new position of the first part is extended to encompass a closest point of the set of positions for a set of data path connection points associated with the data routing lines.

11. The method of claim 9, wherein the new position of the first part is extended to encompass an average point of the set of positions for a set of data path connection points associated with the data routing lines.

12. The method of claim 9, wherein the area defined by the designer input comprises an irregular shape that is not a Manhattan ball.

13. The method of claim 1, wherein analyzing the one or more placement positions comprises calculating a total wirelength for the clock routing lines and the data routing lines for each position of the one or more placement positions; and selecting the first placement position based on a shortest wirelength for said each of the one or more placement positions.

14. The method of claim 13 further comprising:

generating an updated circuit design using the first placement position for the first clock gate; and storing the updated circuit design in the memory.

15. The method of claim 14 further comprising initiating fabrication of an integrated circuit using the updated circuit design.

16. A device comprising:

a memory configured to store a circuit design, the circuit design comprising a clock path for a clock tree, a data path, at least a first clock gate coupled to the clock path and the data path, and an initial placement position for the first clock gate;

one or more processors coupled to the memory and configured to perform operations comprising:

identifying an initial movement area for analyzing an impact of adjusting the initial placement position for the first clock gate to an updated placement position within the initial movement area on a total wirelength for clock routing lines from the first clock gate to the clock path and data routing lines from the first clock gate to the data path;

identifying a set of positions for a set of data path connection points associated with the data routing lines;

identifying an expansion direction from the initial placement position toward the set of positions for the set of data path connection points;

analyzing a set of placement positions comprising at least a first placement position outside the initial movement area, wherein a location of the first placement position is based on the expansion direction; and selecting the first placement position for the first clock gate based on the analyzing the set of placement positions.

17. The device of claim 16, wherein the identifying the expansion direction from the initial placement position toward the set of positions for the set of data path connection points comprising calculating an average position of the set of positions; and wherein the expanding the initial movement area toward the expansion direction to generate the expanded movement area, comprises expanding the initial movement area to include points in a placement grid of the circuit design closer to the average position than points of the initial movement area.

18. The device of claim 17, wherein analyzing the one or more placement positions comprises calculating a total wirelength for the clock routing lines and the data routing lines for each position of the one or more placement positions; and selecting the first placement position based on a shortest wirelength for said each of the one or more placement positions.

19. A non-transitory computer-readable medium comprising instructions that, when executed by one or more processors of an electronic design automation (EDA) computing device, cause the device to perform operations comprising:

accessing a circuit design stored in memory, the circuit design comprising a clock path for a clock tree, a data path, at least a first clock gate coupled to the clock path and the data path, and an initial placement position for the first clock gate;

identifying an initial movement area for analyzing an impact of adjusting the initial placement position for the first clock gate to an updated placement position within the initial movement area on a total wirelength for clock routing lines from the first clock gate to the clock path and data routing lines from the first clock gate to the data path;

identifying a set of positions for a set of data path connection points associated with the data routing lines;

identifying an expansion direction from the initial placement position toward the set of positions for the set of data path connection points;

expanding the initial movement area toward the expansion direction to generate an extended movement area;

analyzing one or more placement positions in the extended movement area; and selecting a first placement position for the first clock gate based on the analyzing the one or more placement positions.

20. The non-transitory computer readable medium of claim 19, wherein the extended movement area is generated by splitting the initial movement area in an original position into a first part in the original position and a second part and a second part in the original position, shifting a first part to a new position in the expansion direction, and connecting the first part of the area in the new position with the second part in the original position.

* * * * *